US010611471B2

(12) United States Patent
Hunter et al.

(10) Patent No.: US 10,611,471 B2
(45) Date of Patent: Apr. 7, 2020

(54) LIGHT WEIGHT RIGID ROTOR WITH BLADE FOLD CAPABILITY

(71) Applicant: Sikorsky Aircraft Corporation, Stratford, CT (US)

(72) Inventors: David H. Hunter, Cheshire, CT (US); Eric Lucien Nussenblatt, Stamford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 754 days.

(21) Appl. No.: 15/308,106

(22) PCT Filed: May 1, 2015

(86) PCT No.: PCT/US2015/028699
§ 371 (c)(1),
(2) Date: Nov. 1, 2016

(87) PCT Pub. No.: WO2015/168496
PCT Pub. Date: Nov. 5, 2015

(65) Prior Publication Data
US 2017/0121018 A1 May 4, 2017

Related U.S. Application Data

(60) Provisional application No. 61/987,883, filed on May 2, 2014.

(51) Int. Cl.
*B64C 27/50* (2006.01)
*B64C 27/33* (2006.01)

(52) U.S. Cl.
CPC .............. *B64C 27/50* (2013.01); *B64C 27/33* (2013.01)

(58) Field of Classification Search
CPC ....... B64C 27/33; B64C 27/055; B64C 27/35; B64C 27/37; B64C 27/45; B64C 27/46; B64C 27/48; B64C 27/50
See application file for complete search history.

(56) References Cited

U.S. PATENT DOCUMENTS 3,135,333 A * 6/1964 Cruz ...................... B64C 27/50
416/143
3,310,120 A * 3/1967 Vacca ...................... B64C 7/00
416/103

(Continued)

OTHER PUBLICATIONS

International Search Report and Written Opinion for Application No. PCT/US2015/028699 dated Aug. 12, 2015; 17 pgs.

*Primary Examiner* — Richard A Edgar
*Assistant Examiner* — Joshua R Beebe
(74) *Attorney, Agent, or Firm* — Cantor Colburn LLP (57) ABSTRACT

A rotor blade rotated about a rotor hub is provided including a first section configured to mount to the rotor hub. The first section includes a spindle and an inboard torque tube surrounding a portion of the spindle. A second section of the rotor blade includes a flexbeam and an outboard torque tube attached to and surrounding the flexbeam. An inboard end of the flexbeam is rotatable coupled to a first end of the spindle. The second section is configured to rotate about a blade axis between an aligned position and a rotated position. A transitional brace configured to surround a portion of the rotor blade adjacent the coupled flexbeam and spindle is movable between a first position and a second position. When in the first position, the transitional brace limits movement of the second section about the blade axis.

12 Claims, 8 Drawing Sheets

(56) References Cited

U.S. PATENT DOCUMENTS

| | | | |
|---|---|---|---|
| 3,357,729 A | | 12/1967 | Kreuger |
| 3,743,441 A | * | 7/1973 | Ferris ................... B64C 27/50 416/143 |
| 4,252,504 A | * | 2/1981 | Covington .............. B64C 27/50 416/143 |
| 4,268,222 A | * | 5/1981 | Bernard ................. B64C 27/50 416/1 |
| 4,419,051 A | * | 12/1983 | DeRosa ................ B64C 27/322 416/134 A |
| 4,568,246 A | * | 2/1986 | Hibyan .................. B64C 27/48 416/134 A |
| 5,249,926 A | * | 10/1993 | D'Anna ................. B64C 27/50 416/142 |
| 5,474,424 A | * | 12/1995 | Bietenhader .......... B64C 27/327 416/134 A |
| 5,782,606 A | * | 7/1998 | Mondet .................. B64C 27/50 416/142 |
| 6,126,398 A | * | 10/2000 | Bauer .................... B64C 27/33 416/134 A |
| 6,196,800 B1 | * | 3/2001 | Bauer .................... B64C 27/33 416/107 |
| 2013/0078100 A1 | * | 3/2013 | Baskin ................... B64C 11/06 416/204 R |
| 2014/0112785 A1 | * | 4/2014 | Kuntze-Fechner ..... B64C 27/33 416/134 A |

\* cited by examiner

LIGHT WEIGHT RIGID ROTOR WITH BLADE FOLD CAPABILITY

CROSS-REFERENCE TO RELATED APPLICATION

This application is a National Phase Application of Patent Application PCT/US2015/028699 filed on May 1, 2015, the contents of which are incorporated herein by reference in their entirety.

This application claims the benefit of U.S. provisional patent application Ser. No. 61/987,883 filed May 2, 2014, the entire contents of which are incorporated herein by reference.

BACKGROUND OF THE INVENTION

Exemplary embodiments of the invention relate to a blade assembly for a rotary wing aircraft, and more particularly, to a blade assembly configured to fold about a blade fold axis.

The flight capabilities of rotary-wing aircrafts make them effective for a wide variety of missions; however, operation of rotary-wing aircraft in certain environments may be limited by the overall structural envelopes thereof. The radial dimensions of a rotary-wing aircraft main rotor assembly results in a rotary-wing aircraft having relatively large structural envelopes which may impact its utility in some environments. For example, space on a ship or vessel is generally at a premium and the structural envelope of a rotary wing aircraft may require a significant allocation of such limited space. Furthermore, strategic and tactical considerations in the military utilization of rotary-wing aircrafts has led to a requirement for rotary-wing aircrafts having main rotor assemblies that may be readily reconfigured for rapid deployment, routine transport, and/or stowage by reducing the structural envelope.

One way to reduce the structural envelope of rotary-wing aircraft to facilitate rapid deployment, routine transport, stowage, and reduce the vulnerability thereof to environmental conditions is to design the main rotor assembly so that the main rotor blades fold relative to the main rotor hub. However, conventional blade folding systems are cumbersome and are susceptible to drag, thereby decreasing the efficiency of the rotary wing aircraft in flight.

BRIEF DESCRIPTION OF THE INVENTION

According to one embodiment of the invention, a rotor blade rotated about a rotor hub is provided including a first section configured to mount to the rotor hub. The first section includes a spindle and an inboard torque tube surrounding a portion of the spindle. A second section of the rotor blade includes a flexbeam and an outboard torque tube attached to and surrounding the flexbeam. An inboard end of the flexbeam is rotatable coupled to a first end of the spindle. The second section is configured to rotate about a blade axis between an aligned position and a rotated position. A transitional brace configured to surround a portion of the rotor blade adjacent the coupled flexbeam and spindle is movable between a first position and a second position. When in the first position, the transitional brace limits movement of the second section about the blade axis.

In addition to one or more of the features described above, or as an alternative, in further embodiments a plurality of fasteners couple the transitional brace to the inboard torque tube and the outboard torque tube when the transitional brace is in the first position.

In addition to one or more of the features described above, or as an alternative, in further embodiments the transitional brace is configured to slide in an inboard direction when transitioning to the second position such that the transitional brace substantially overlaps the inboard torque tube.

In addition to one or more of the features described above, or as an alternative, in further embodiments the spindle comprises a first arm and a second arm extending from the first end in an opposite direction. The second arm is substantially identical to and spaced apart from the first arm.

In addition to one or more of the features described above, or as an alternative, in further embodiments the first section further comprises a bearing block arranged within an opening formed between the first arm and the second arm of the spindle. The first arm of the spindle is positioned adjacent a first side of the bearing block and a second arm of the spindle is positioned near a second side of the bearing block.

In addition to one or more of the features described above, or as an alternative, in further embodiments the rotor blade is configured for use with an open rotor hub having a plurality of rotor members mounted about a circumference of a base plate.

In addition to one or more of the features described above, or as an alternative, in further embodiments the bearing block and at least a portion of the first arm and the second arm of the spindle are positioned within an opening formed between adjacent rotor members. A portion of each rotor member is fastened to the bearing block and one of the first arm and the second arm.

In addition to one or more of the features described above, or as an alternative, in further embodiments at least one of the inboard torque tube and the outboard torque tube includes an abrasion resistant material such that as the transitional brace moves between the first position and the second position, the transitional brace is configured to engage the abrasion resistant material.

A method of folding rotor blade including a first section, a second section, and a transitional brace is provided including unfastening a fastener system coupling the transitional brace to the first section and the second section. The transitional brace is moved from a first position to a second position to expose an interface where the first section and the second section are rotatable coupled. The second section of the rotor blade is pivoted about a blade axis from an aligned position to a rotated position while the transitional brace is in the second position.

In addition to one or more of the features described above, or as an alternative, in further embodiments moving the transitional brace comprises sliding the brace along a longitudinal axis of the rotor blade between the first position and the second position.

In addition to one or more of the features described above, or as an alternative, in further embodiments the transitional brace is configured to slide in an inboard direction when transitioning to the second position such that the transitional brace substantially overlaps the first section.

In addition to one or more of the features described above, or as an alternative, in further embodiments the second section of the rotor blade is rotated about the blade axis manually.

In addition to one or more of the features described above, or as an alternative, in further embodiments the second section of the rotor blade is rotated about the blade axis automatically.

In addition to one or more of the features described above, or as an alternative, in further embodiments the second section of the rotor blade is pivoted from the rotated position to the aligned position while the transitional brace is in the second position. The transitional brace is moved from the second position to the first position to cover the interface rotatably coupling the first section and the second section while the second section is in the aligned position. The fastening system is fastened to couple the transitional brace to the first section and the second section.

Technical effects include the ability to fold a rigid rotor blade mounted to an open rotor hub.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
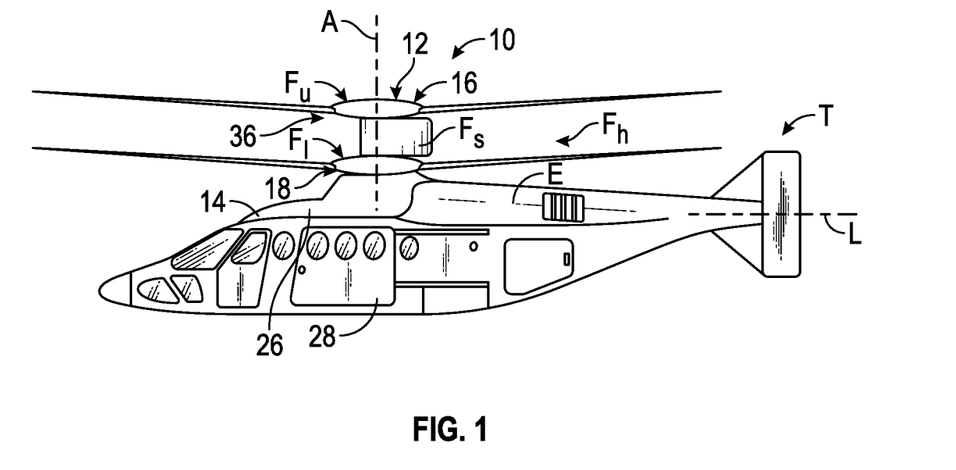
FIG. 1 is a side view of an example of a rotary wing aircraft.

FIG. 1 illustrates an exemplary vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system T which provides translational thrust generally parallel to an aircraft longitudinal axis L. Although a particular aircraft configuration is illustrated in the disclosed embodiment, other counter-rotating, coaxial rotor systems and non-coaxial rotor systems will also benefit from the present invention.

A main gearbox 26 which may be located above the aircraft cabin drives the rotor system 12. The translational thrust system T may be driven by the same main gearbox 26 which drives the rotor system 12. The main gearbox 26 is driven by one or more engines (illustrated schematically at E). As shown, the main gearbox 26 may be interposed between the gas turbine engines E, the rotor system 12 and the translational thrust system T.

Figure 2:
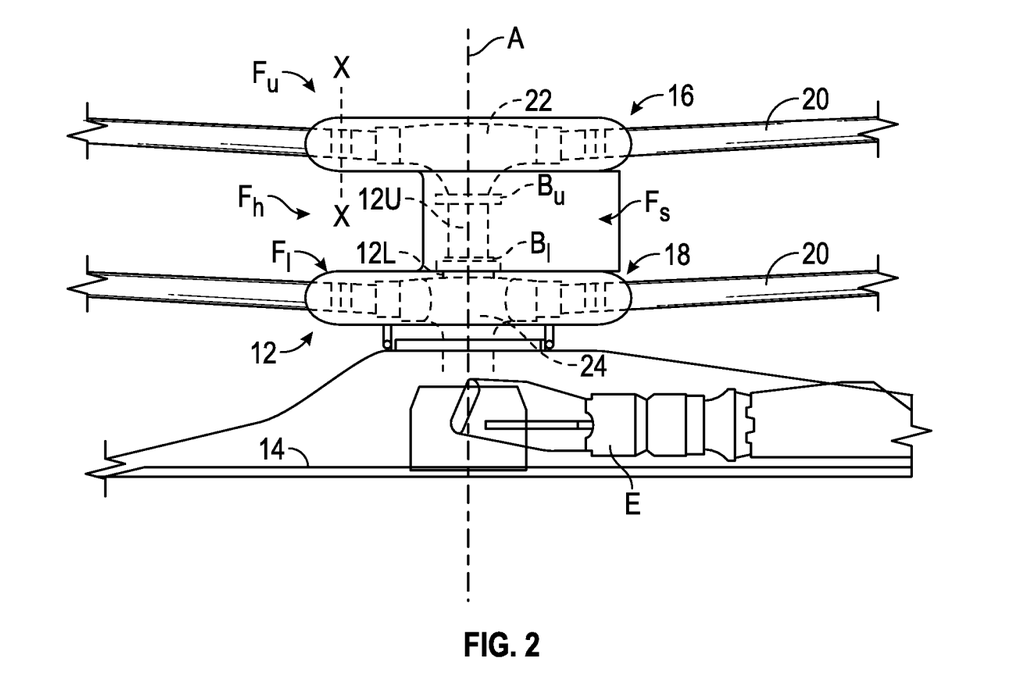
FIG. 2 is an cross-sectional view of a main rotor system of the aircraft illustrated in FIG. 1.

Referring to FIG. 2, the dual, counter-rotating, coaxial rotor system 12 includes an upper rotor system 16 and a lower rotor system 18. Each rotor system 16, 18 includes a plurality of rotor blade assemblies 20 mounted to a rotor hub assembly 22, 24 for rotation about a rotor axis of rotation A. A plurality of the main rotor blade assemblies 20 project radially outward from the hub assemblies 22, 24. Any number of main rotor blade assemblies 20 may be used with the rotor system 12.

While not required in all aspects, the shown rotor system 12 also includes a rotor hub fairing system Fh generally located between and around the upper and lower rotor systems 16, 18 such that the rotor hub assemblies 22, 24 are at least partially contained therein. The rotor hub fairing system Fh preferably includes an upper hub fairing Fu, a lower hub fairing Fl and a shaft fairing Fs there between. The shaft fairing Fs is preferably attached to the counter-rotating, coaxial rotor system 12 through a bearing arrangement Bu, Bl such that the shaft fairing Fs is aligned with the relative wind in forward flight but may be free to pivot during low speed maneuvering. The upper bearing Bu and the lower bearing Bl are respectively located adjacent an upper portion and a lower portion of the shaft fairing Fs. The upper bearing Bu is preferably attached to one rotor shaft 12U while the lower bearing Bl attached to the other rotor shaft 12L such that the bearings counter-rotate and net bearing drag is relatively low.

Referring now to FIGS. 3-8, at least one rotor blade assembly 20 includes a rotor blade 28 configured to fold about a blade fold axis X (FIG. 2) arranged generally perpendicular to the blade chord at or near the blade fold axis X. The rotor blade 20 is divided into a first section 30 and a complementary second section 70. The first section 30 includes a generally oval bearing block 32 arranged near an inboard end 29 of the rotor blade 28. A spindle 36 (FIG. 5) formed from a metal or composite material includes a first generally open end 38, and a first and second arm 40, 42 extending in a direction away from the first end 38. The first arm and second arm 40, 42 are substantially identical and are spaced apart from one another by a distance generally equal to the width of the bearing block 32. As illustrated more clearly in FIG. 5, the first arm 40 of the spindle 36 is configured to contact a first side 34 of the bearing block 32 and the second arm 42 of the spindle 36 is configured to contact a second, opposite side (not shown) of the bearing block 32 such that the bearing block 32 is at least partially positioned within the opening 44 formed between the arms 40, 42 of the spindle 36.

In the illustrated, non-limiting component, the rotor hub adjacent the bearing block, such as rotor hub 22, 24 for example, is an open rotor hub designed to facilitate access to and the service of components within the interior of the rotor shaft 12. The open rotor hub, illustrated in FIG. 6, includes a plurality of similar rotor members 46 mounted about a circumference of a base plate (not shown). The bearing block 32 and at least a portion of the first and second arms 40, 42 of the spindle 36 are arranged within an opening 48 (FIG. 8) formed between two adjacent rotor members 46. A fastener system, such as the shown plurality of fasteners 50, couples both the arms 40, 42 of the spindle 36 and the bearing block 32 to the adjacent rotor members 46 to prevent movement of the first section 30 of the rotor blade 28 relative to the hub. While shown with multiple fasteners 50, it is understood that aspects could use a single fastener and/or non-removable fasteners (such as clasps) to couple the arms 40, 42 to members 46.

Figure 7:
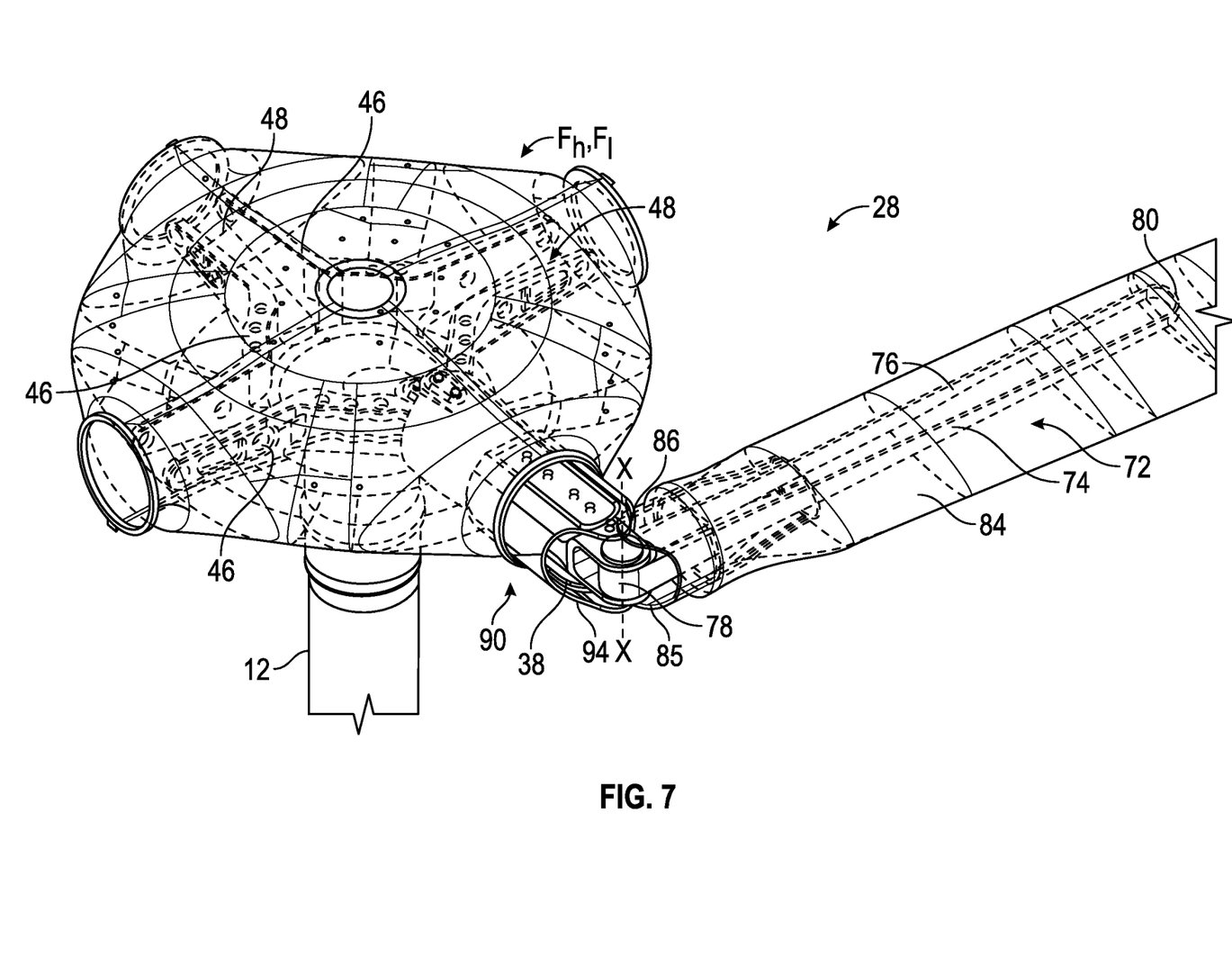
FIG. 7 is a perspective view of a folded rotor blade of a rotary wing aircraft according to an embodiment of the invention.
Figure 8:
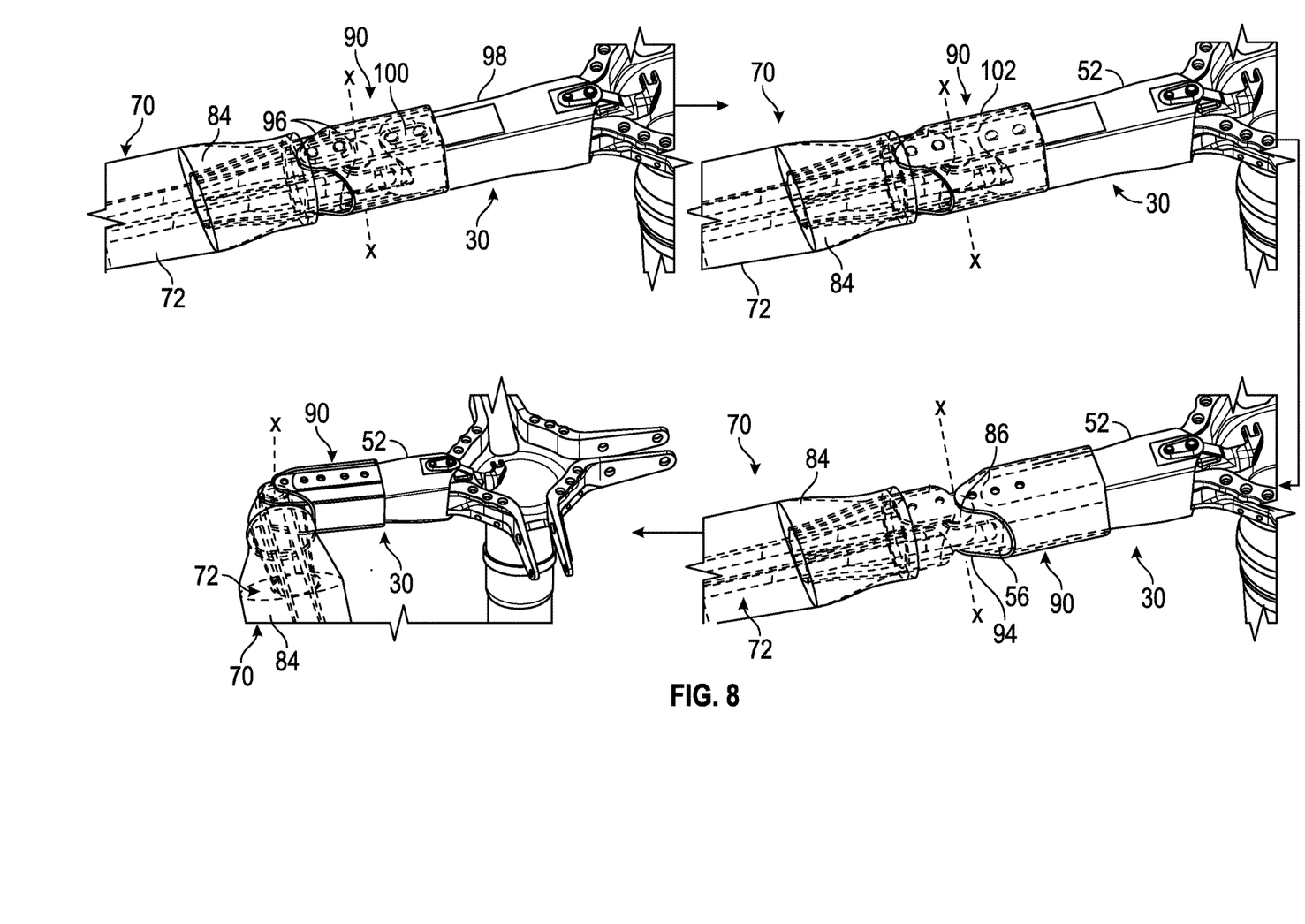
FIG. 8 is a series of perspective views of a rotor blade as the rotor blade is rotated from an aligned position to a rotated position according to an embodiment of the invention.

The first section 30 of the rotor blade 28 additionally includes a generally hollow inboard torque tube 52 configured to surround the bearing block 32, a portion of the spindle 36, and at least a portion of the rotor members 50 connected thereto. A first end 54 of the inboard torque tube 52 is coupled to a connector 58 extending from the adjacent rotor hub with a plurality of fasteners 60. In one embodiment, the first end 54 of the inboard torque tube 52 is positioned within the interior of a rotor hub fairing, such as fairing Fu or Fl for example (FIG. 7). The inboard torque tube 52 extends over a portion of the length of the first section 30, along a longitudinal axis (not shown) of the blade 28. The first end 38 of the spindle 36 is positioned beyond the second end 56 of the inboard torque tube 52 such that the first end 38 of the spindle 36 is generally exposed.

Figure 6:
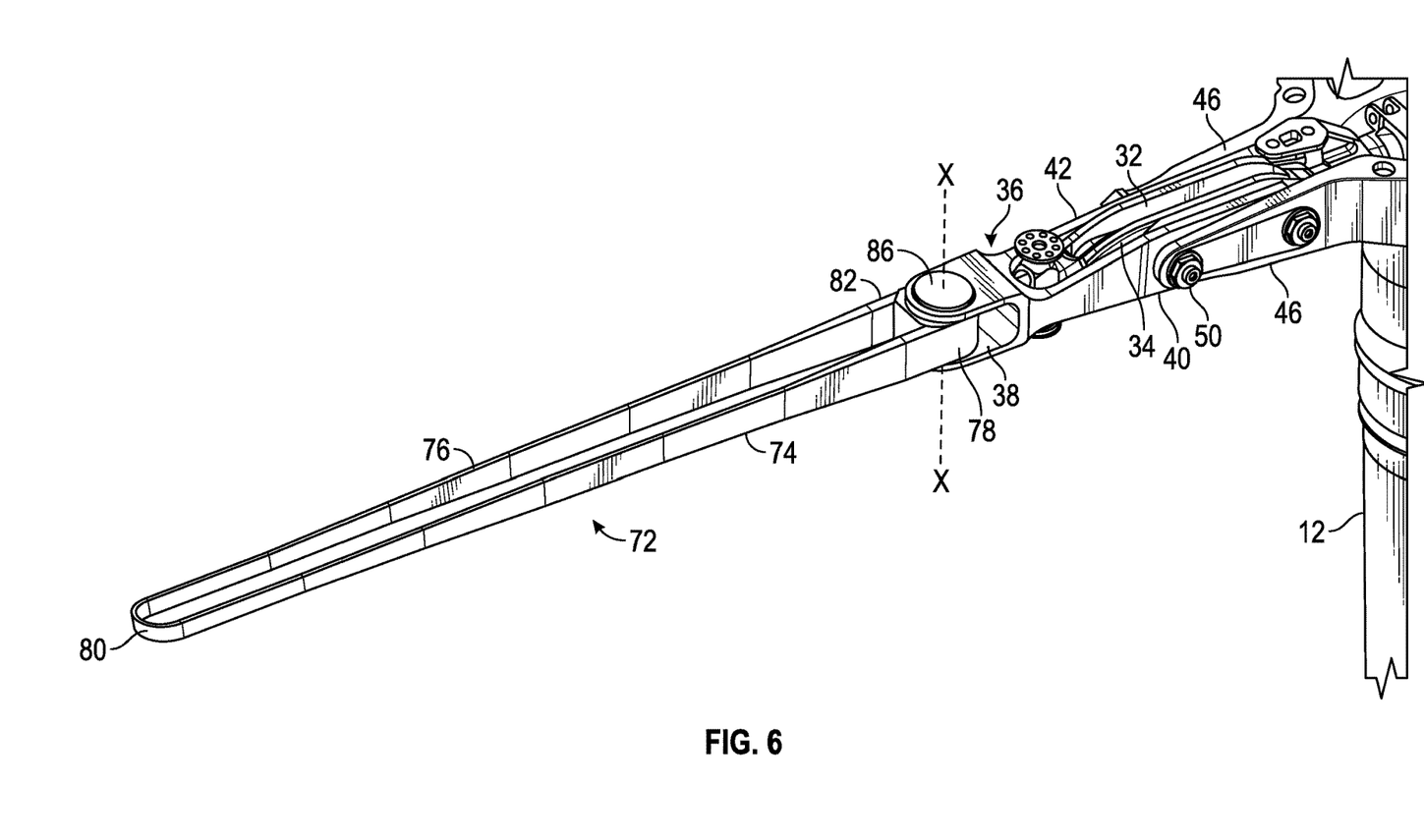
FIG. 6 is a perspective view of the interior of a rotor blade of a rotary wing aircraft according to an embodiment of the invention.

The second section 70 of the rotor blade 28 includes a generally U-shaped, continuous flexible structural member 72, also referred to as a flexbeam. The structural flexbeam has a substantially identical first side 74 and second side 76, connected by an inboard end 78 and an outboard end 80. In one embodiment, a metal nut 82 is arranged at the inboard end 78 of the flexbeam 72. The width of the flexbeam 72 may vary over the length of the flexbeam 72, as illustrated in FIG. 6; however, the thickness of the flexbeam 72 remains generally constant. In one embodiment, the width of the inboard end 78 of the flexbeam 72 is substantially larger than the width of the outboard end 80 of the flexbeam 72. An outboard torque tube 84 having an airfoil cross-section surrounds the majority of the flexbeam 72, excluding the inboard end 78. The outboard torque tube 84 is illustrated as generally transparent for clarity. The inboard end 78 of the flexbeam 72, including the nut 82, is generally arranged within the first open end 38 of the spindle 36. A fastener 86, such as a dowel or pin for example, extends through both the spindle 36 and the nut 82 to couple the flexbeam 72 to the spindle 36. As a result, the pin 86 rotatably couples the second section 70 of the rotor blade 28 to the first section 30. The second section 70 of the rotor blade 28 is therefore configured to rotate a desired amount about a blade axis X, defined by the pin 86, between a position substantially aligned with the first section 30 of the rotor blade 28 (FIG. 3) and a rotated position (FIG. 7). In one embodiment, the adjacent ends of the inboard torque tube 52 and the outboard torque tube 84 are contoured to provide a clearance there between when the second section 70 of the rotor blade 28 is in the rotated position.

Figure 3:
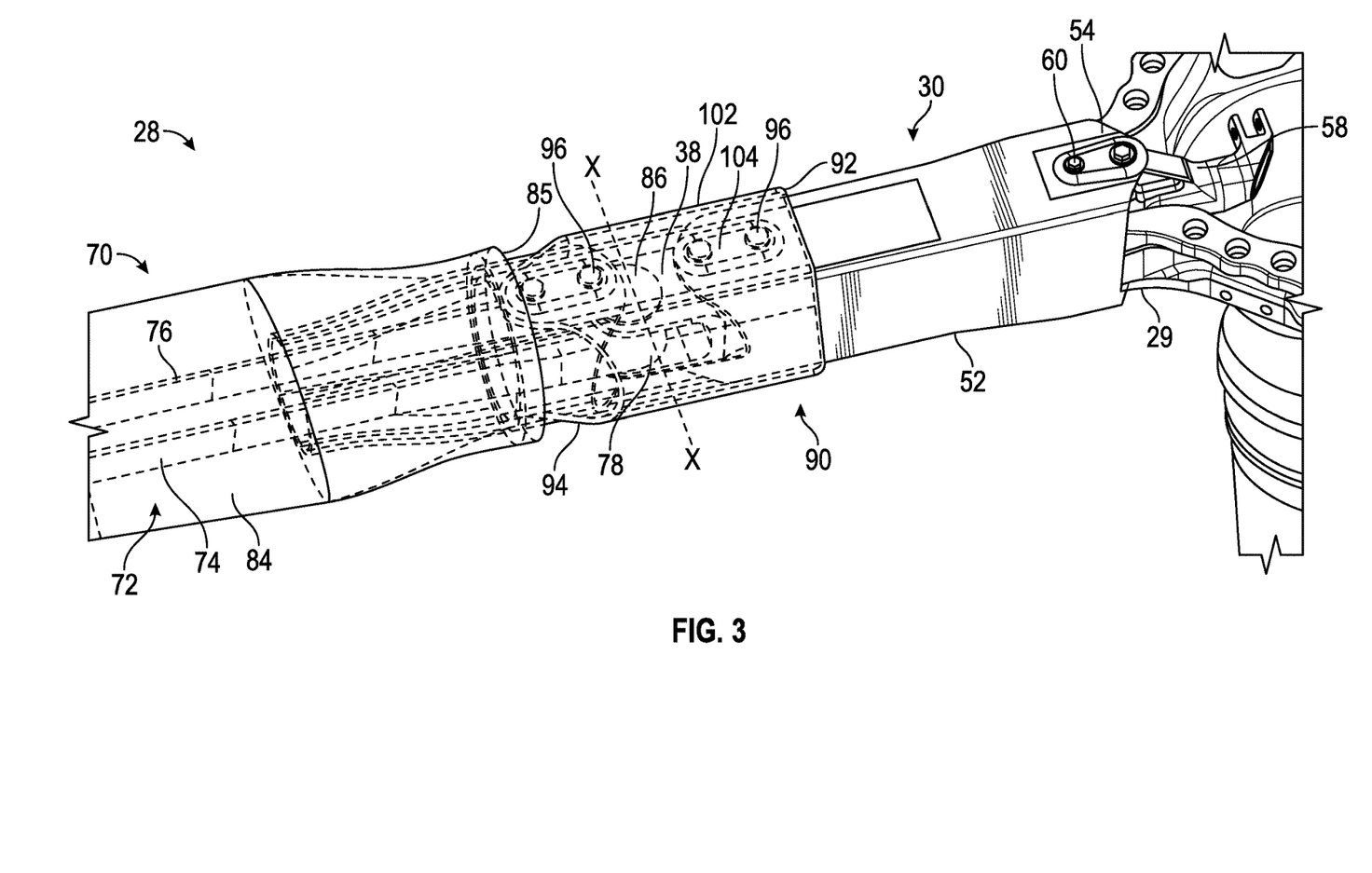
FIG. 3 is a perspective view of a portion of a rotor blade of a rotary wing aircraft according to an embodiment of the invention.
Figure 4:
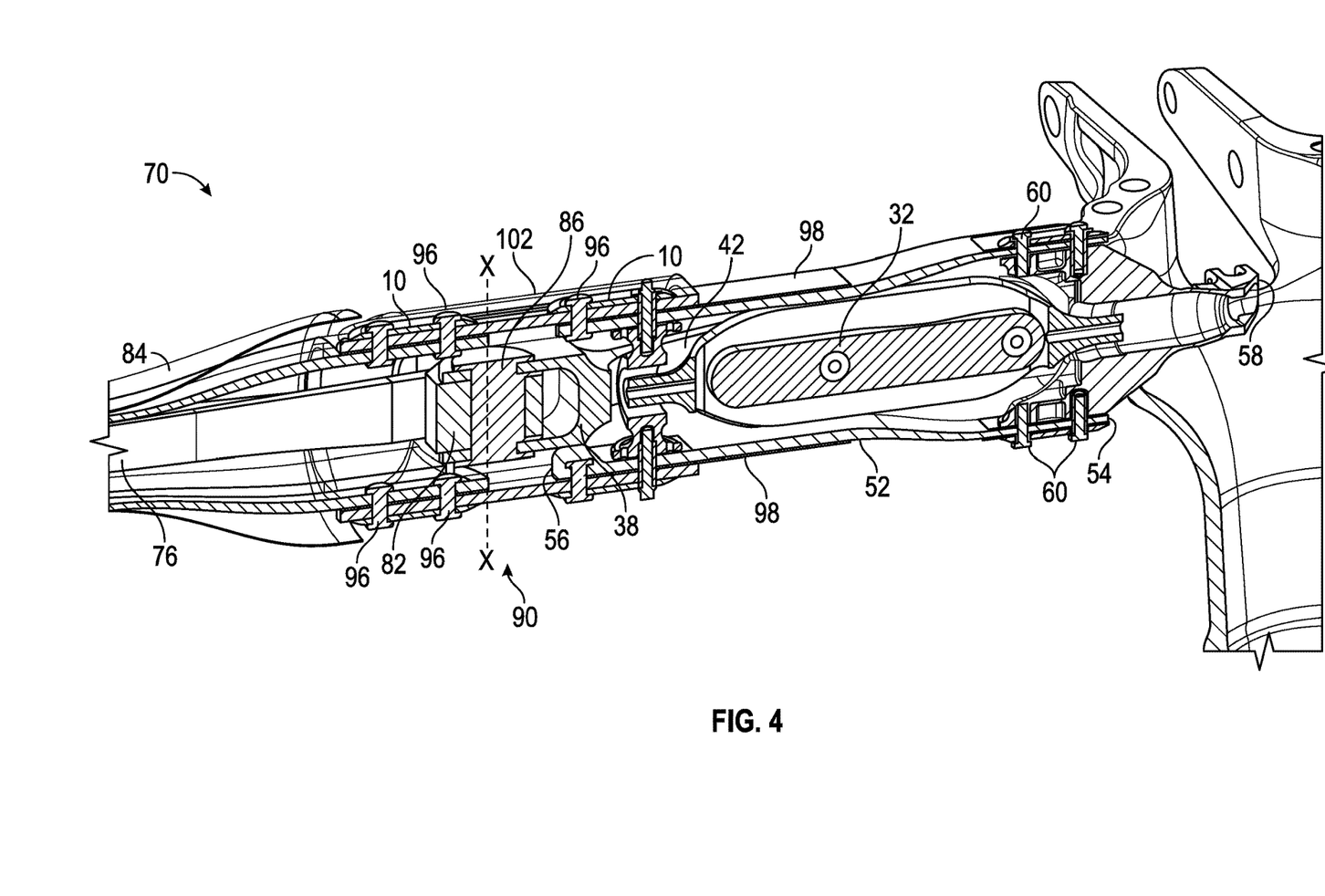
FIG. 4 is a cross-sectional view of the portion of the rotor blade of a rotary wing aircraft illustrated in FIG. 3 according to an embodiment of the invention.
Figure 5:
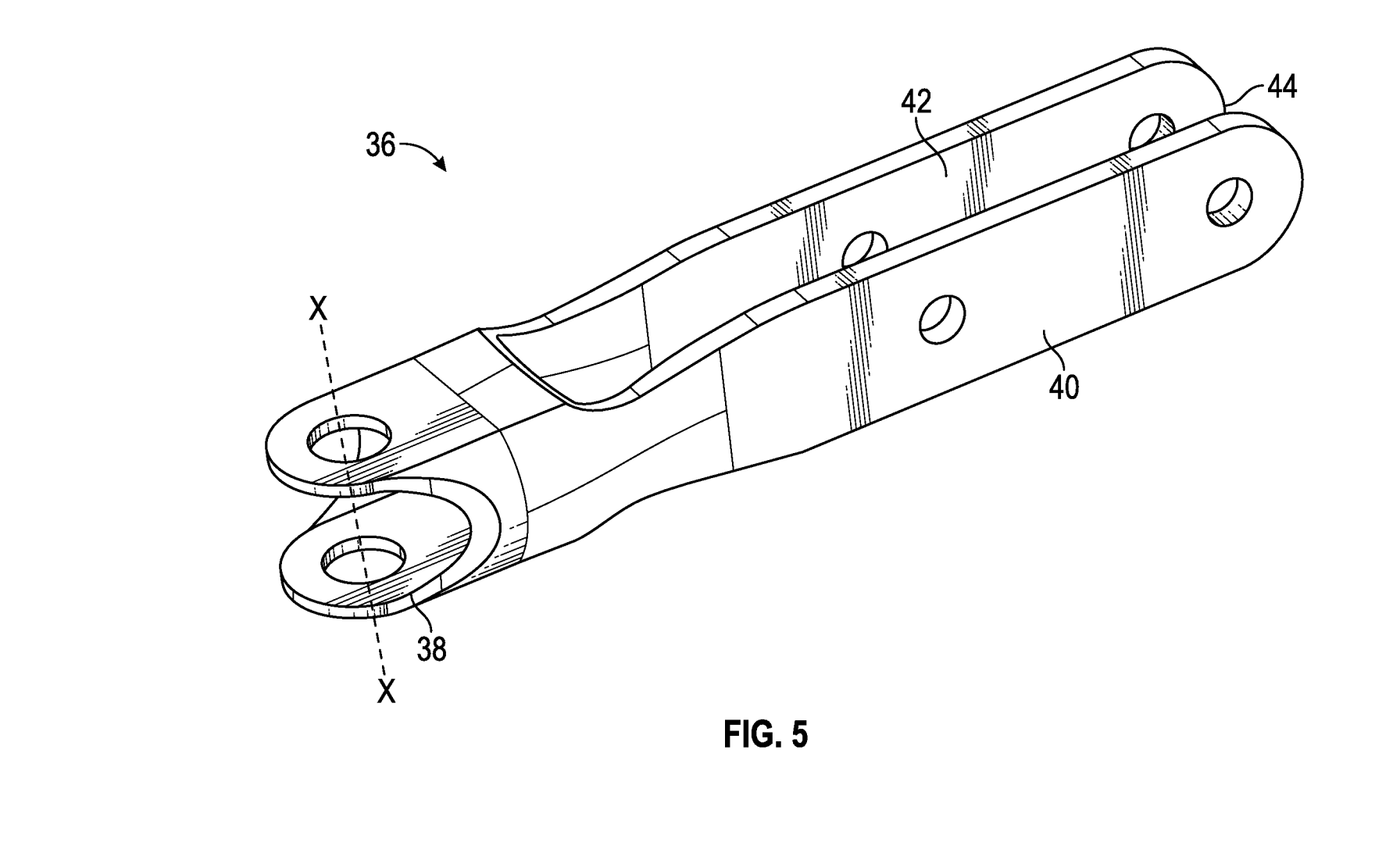
FIG. 5 is a perspective view of a spindle of the first section of the rotor blade according to an embodiment of the invention.

The rotor blade 28 additionally includes a generally hollow transitional brace 90. In one embodiment, the transitional brace 90 may be formed from the same material as the inboard and outboard torque tubes 52, 84, such as a composite for example. To allow for rotation of the second section 70 of the rotor blade 28 about the blade axis X, the transitional brace 90 is configured to slide between a first position (FIGS. 3 and 4) and a second position (FIG. 7). When the second section 70 of the rotor blade 28 is generally aligned with the first section 30, the transitional brace 90 is in the first position and is configured to surround the interface between the first end 38 of the spindle 36 and the inboard end 78 of the flexbeam 72 to limit movement of the second section 70 of the rotor blade 28 about the blade axis X. In the first position, a first end 92 of the transitional brace 90 overlaps the exterior of the second end 56 of the inboard torque tube 52, and a second end 94 of the transitional brace 90 surrounds the exterior of the first end 85 of the outboard torque tube 84. When in the first position, such as during operation of the rotary wing aircraft 10, the transitional brace 90 may be coupled to the both the inboard torque tube 52 and the outboard torque tube 84 with a plurality of fasteners 96, as shown in FIG. 3.

The transitional brace 90 is moved generally along the longitudinal axis of the rotor blade 28 to the second position to expose the pin 86 coupling the first end 38 of the spindle 36 to the inboard end 78 of the flexbeam 72. When the transitional brace 90 is in the second position, the second section 70 of the rotor blade 28 is free to pivot about the blade axis X between the aligned position and the rotated position. In the illustrated, non-limiting embodiment, the transitional brace 90 is configured to slide in a generally inboard direction such that the portion of the transitional brace 90 arranged in an overlapping configuration with the inboard torque tube 52 increases. However, embodiments where the transitional brace 90 is configured to slide in a generally outboard direction in an overlapping configuration with the outboard torque tube 84 are within the scope of the invention. In one embodiment, the inboard torque tube 52 and/or the outboard torque tube 84 includes one or more pads 98 formed from an abrasion resistant composite material, such as nylon or Teflon impregnated material for example, that prevent damage from occurring as a result of sliding the transitional brace 90.

Figure 9:
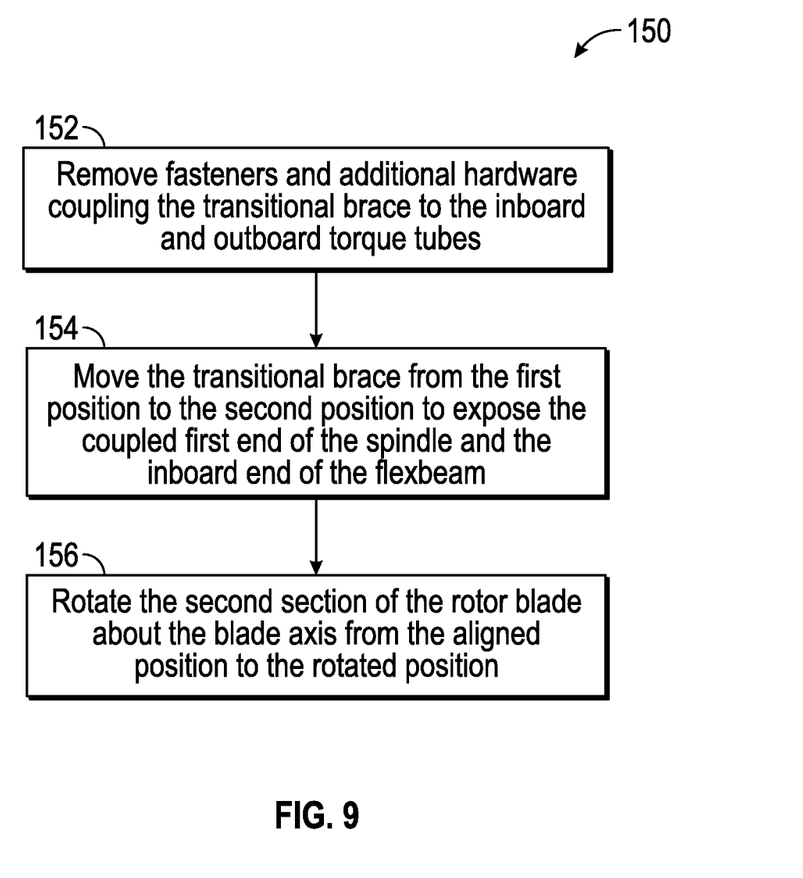
FIG. 9 is a block diagram illustrating a method of folding the rotor blade of a rotary wing aircraft according to an embodiment of the invention.

A method 150 of folding the rotor blade 28 is shown in more detail in the sequence illustrated in FIG. 9. In block 152, the plurality of fasteners 96 coupling the transitional brace 90 to the outboard torque tube 84 and the inboard torque tube 52 are removed. In some embodiments, additional hardware, such as cauls 100 positioned between the fasteners 96 and an exterior surface 102 of the transitional brace 90 are also removed. The transitional brace 90 is then moved from a first position to a second position, in block 154, to expose the pin 86 connecting the first end 38 of the spindle 36 and the inboard end 78 of the flex beam 72. The transitional brace 90 is generally slid along the axis of the rotor blade 28 such that the transitional brace 90 overlaps a portion of the inboard torque tube 52. As shown in block 156, the second section 70 of the rotor blade 28 is then pivoted about the blade axis X from the aligned position to the rotated position. The rotation of the second section 70 of the rotor blade 28 may be performed manually, or alternatively, may be performed automatically, such as with an actuator (not shown) for example.

The rotor blade 28 described herein allows for in plane and out of plane stiffness and strength, but still allows the flexibility to fold and store the rotary wing aircraft 10 without significant disassembly. As a result of the position of the bend in the rotor blade 28, the rotor blade 28 is configured to fold without removal of a fairing or other components near the inboard end 29.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, aspects could be used in other aircraft rotors, wings, wind turbines or other structures where selective bending is needed for transport, space savings, protection from weather, or other like reasons. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotor blade rotated about a rotor hub, the rotor blade comprising:
   a first section configured to mount to the rotor hub, the first section including a spindle and an inboard torque tube surrounding a portion of the spindle;
   a second section including a flexbeam and an outboard torque tube attached to the flexbeam, an inboard end of the flexbeam being rotatably coupled to a first end of the spindle such that the second section is configured to rotate about a blade axis between an aligned position and a rotated position; and
   a transitional brace configured to surround a portion of the rotor blade adjacent the coupled flexbeam and spindle, the transitional brace being configured to move selectively between a first position and a second position, wherein when the transitional brace is in the first position, the transitional brace limits movement of the second section about the blade axis, and when the transitional brace is in the second position, the second section is able to pivot to the rotated position, wherein the transitional brace is configured to slide in an inboard direction when transitioning to the second position such that the transitional brace substantially overlaps the inboard torque tube.

2. The rotor blade according to claim 1, wherein a plurality of fasteners couple the transitional brace to the inboard torque tube and the outer torque tube when the transitional brace is in the first position.

3. The rotor blade according to claim 1, wherein the spindle comprises a first arm and a second arm that form a second end, opposite the first end, the first arm and the second arm extending towards the first end, the second arm being identical to and the first arm and spaced therefrom by a distance.

4. The rotor blade according to claim 3, wherein the first section further comprises a bearing block arranged within an opening formed between the first arm and the second arm of the spindle such that the first arm of the spindle is positioned adjacent a first side of the bearing block and the second arm of the spindle is arranged next to a second side of the bearing block.

5. The rotor blade according to claim 4, wherein the rotor blade is affixable to an open rotor hub including a plurality of rotor members mounted about a circumference of a base plate.

6. The rotor blade according to claim 5, wherein the bearing block and at least a portion of the first arm and the second arm of the spindle are positioned within an opening formed between adjacent rotor members, such that a portion of each rotor member is fastened to one of the first arm and second arm and the bearing block.

7. The rotor blade according to claim 1, wherein at least one of the inboard torque tube and the outboard torque tube includes an abrasion resistant material such that as the transitional brace moves between the first and second position, the transitional brace is configured to engage the abrasion resistant material.

8. A method of folding a rotor blade, the rotor blade including a first section, a second section, and a transitional brace, comprising:
   unfastening a fastener system coupling the transitional brace to the first section and the second section;
   moving the transitional brace from a first position to a second position to expose an interface rotatably coupling the first section and the second section, wherein moving the transitional brace from a first position to a second position comprises sliding the transitional brace in an inboard direction such that the transitional brace substantially overlaps the first section; and
   pivoting the second section of the rotor blade about a blade axis from an aligned position to a rotated position while the transitional brace is in the second position.

9. The method according to claim 8, wherein the moving the transitional brace comprises sliding the transitional brace along a longitudinal axis of the rotor blade between the first position and the second position.

10. The method according to claim 8, wherein the second section of the rotor blade is rotated about the blade axis manually.

11. The method according to claim 8, wherein the second section of the rotor blade is rotated about the blade axis automatically.

12. The method according to claim 8, further comprising:
   pivoting the second section of the rotor blade about the blade axis from the rotated position to the aligned position while the transitional brace is in the second position;
   moving the transitional brace from the second position to the first position to cover the interface rotatably coupling the first section and the second section while the second section is in the aligned position; and
   fastening the fastening system to couple the transitional brace to the first section and the second section.

* * * * *